(12) United States Patent
Boragno et al.

(10) Patent No.: US 11,292,858 B2
(45) Date of Patent: Apr. 5, 2022

(54) POLYPROPYLENE COMPOSITION COMBINING LOW SEALING INITIATION TEMPERATURE AND HIGH MELTING TEMPERATURE

(71) Applicant: BOREALIS AG, Vienna (AT)

(72) Inventors: Luca Boragno, Pichling (AT); Luigi Resconi, Neuhofen an der Krems (AT); Mattias Hoff, Steyregg (AT); Shital Das, Helsinki (FI); Kauno Alastalo, Porvoo (FI); Markku Vahteri, Porvoo (FI); Friedrich Berger, Linz (AT); Davide Tranchida, Linz (AT)

(73) Assignee: BOREALIS AG, Vienna (AT)

( * ) Notice: Subject to any disclaimer, the term of this patent is extended or adjusted under 35 U.S.C. 154(b) by 346 days.

(21) Appl. No.: 16/469,034

(22) PCT Filed: Dec. 19, 2017

(86) PCT No.: PCT/EP2017/083463
§ 371 (c)(1),
(2) Date: Jun. 12, 2019

(87) PCT Pub. No.: WO2018/122031
PCT Pub. Date: Jul. 5, 2018

(65) Prior Publication Data
US 2021/0309774 A1    Oct. 7, 2021

(30) Foreign Application Priority Data
Dec. 29, 2016   (EP) .................................... 16207303

(51) Int. Cl.
| | | |
|---|---|---|
| C08F 210/06 | (2006.01) | |
| C08L 23/14 | (2006.01) | |
| C08F 2/34 | (2006.01) | |
| C08F 120/02 | (2006.01) | |
| C08F 210/08 | (2006.01) | |
| C08L 23/18 | (2006.01) | |

(52) U.S. Cl.
CPC .............. *C08F 210/06* (2013.01); *C08F 2/34* (2013.01); *C08F 120/02* (2013.01); *C08F 210/08* (2013.01); *C08L 23/14* (2013.01); *C08L 23/18* (2013.01)

(58) Field of Classification Search
CPC .... C08L 24/14; C08L 23/18; C08L 2203/162; C08L 2205/02; C08L 23/14; C08F 210/06; C08F 210/08
See application file for complete search history.

(56) References Cited

U.S. PATENT DOCUMENTS

| | | | | |
|---|---|---|---|---|
| 5,296,548 | A * | 3/1994 | Covezzi ................ | C08F 297/08 525/322 |
| 5,623,021 | A * | 4/1997 | Pelliconi ................ | B32B 27/08 525/240 |
| 6,395,831 | B1 * | 5/2002 | Pelliconi ................ | C08L 23/14 525/191 |
| 7,557,161 | B2 * | 7/2009 | Pelliconi ............... | C08L 23/142 525/191 |
| 8,779,062 | B2 * | 7/2014 | Paavilainen ......... | C09D 123/10 525/191 |
| 8,889,792 | B2 * | 11/2014 | Paavilainen .......... | C08L 23/142 525/191 |
| 9,062,232 | B2 * | 6/2015 | Reichelt ................ | C08L 23/142 |
| 9,273,201 | B2 * | 3/2016 | Reichelt ................ | C08F 210/06 |
| 9,512,253 | B2 * | 12/2016 | Reichelt ................ | C08F 210/06 |
| 9,896,577 | B2 * | 2/2018 | Reichelt .................. | C08L 23/14 |
| 9,988,523 | B2 * | 6/2018 | Tranninger ............ | C08F 210/06 |
| 10,487,203 | B2 * | 11/2019 | Boragno .................... | C08J 5/18 |
| 10,611,901 | B2 * | 4/2020 | Covezzi .................... | C08J 5/18 |
| 2008/0188622 | A1 | 8/2008 | Nozawa | |
| 2020/0087499 | A1 * | 3/2020 | Massari .................. | C08L 23/14 |

FOREIGN PATENT DOCUMENTS

| | | |
|---|---|---|
| EP | 0483523 A1 | 5/1992 |
| EP | 0887379 B1 | 12/1998 |
| EP | 2610271 B1 | 7/2013 |
| EP | 2610272 B1 | 7/2013 |
| EP | 2778182 A1 | 9/2014 |
| EP | 3064548 A1 | 9/2016 |
| KR | 10-2015-0135331 A | 12/2015 |
| RU | 2059670 C1 | 5/1996 |
| WO | 92/12182 A1 | 7/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2011/064119 A1 | 6/2011 |
| WO | 2012/007430 A1 | 1/2012 |

(Continued)

OTHER PUBLICATIONS

Search Report for Chinese Patent Application No. 201780076787.1, dated Nov. 7, 2019.
Office action for Chinese Patent Application No. 201780076787.1, dated Nov. 13, 2019.
Office action for Korean Patent Application No. 10-2019-7014945, dated Aug. 5, 2019.
Griffin, et al., "Low-load rotor-synchronised Hahn-echo pulse train (RS-HEPT) 1H decoupling in solid-state NMR: factors affecting MAS spin-echo dephasing times", Oct. 16, 2007, pp. S198-S208.
Parkinson, et al., "Effect of Branch Length on 13C NMR Relaxation Properties in Molten Poly[ethylene-co-(a-olefin)] Model Systems", 2007, pp. 21828-2133.

(Continued)

*Primary Examiner* — Rip A Lee
(74) *Attorney, Agent, or Firm* — Tarolli, Sundheim, Covell & Tummino LLP

(57) ABSTRACT

The invention relates to a polypropylene composition which combines low sealing initiation temperature (SIT) and high melting point (Tm), thus having a broad sealing window.

7 Claims, No Drawings

(56) References Cited

FOREIGN PATENT DOCUMENTS

WO   2016/139163 A1   9/2016

OTHER PUBLICATIONS

Busico, et al., "Full Assignment of the 13C NMR Spectra of Regioregular Polypropylenes: Methyl and Methylene Region", Macromolecules 1997, pp. 6251-6263.

Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, pp. 1128-1134.

Busico, et al., "Microstructure of polypropylene", Prog. Polym. Sci. 26, (2001), pp. 443-533.

Castignolles, et al. "Detection and quantification of branching in polyacrylates by size-exclusion chromatography (SEC) and melt-state 13C NMR spectroscopy", (2009), pp. 2373-2383.

Filip, et al., "Heteronuclear decoupling under fast MAS by a rotor-synchronized Hahn-echo pulse train", Journal of Magnetic Resonance, (2005), pp. 239-243.

Pollard, et al., "Observation of Chain Branching in Polyethylene in the Solid State and Melt via 13C NMR Spectroscopy and Melt NMR Relaxation Time Measurements", Macromolecules 2004, pp. 813-825.

Resconi, et al., "Selectivity in Propene Polymerization with Metallocene Catalysts", Chem. Rev. 2000, pp. 1253-1345.

Zhou, et al., "A new decoupling method for accurate quantification of polyethylene copolymer composition and triad sequence distribution with 130 NMR", Journal of Magnetic Resonance 187, (2007), pp. 225-233.

Klimke, et al., "Optimisation and Application of Polyolefin Branch Quantification by Melt-State 130 NMR Spectroscopy", Macromol. Chem. Phys. 2006, pp. 382-395.

Search Report for Russian Patent Application No. 2019121757/04, dated Jan. 10, 2020.

Office action for Russian Patent Application No. 2019121757/04, dated Jan. 21, 2020.

* cited by examiner

POLYPROPYLENE COMPOSITION COMBINING LOW SEALING INITIATION TEMPERATURE AND HIGH MELTING TEMPERATURE

The present invention relates to a polypropylene composition having improved low sealing temperature and high melting temperature. The invention also relates to a process for producing the polypropylene composition, to articles, in particular films comprising the polypropylene composition and to the use of the composition for the manufacture thereof.

Propylene homopolymers and copolymers are suitable for many applications such as packaging, textile, automotive and pipe. An important area of application of propylene polymers is the packaging industry. Particularly in film application where sealing properties play an important role, e.g., heat sealing.

Heat sealing is the predominant method of manufacturing flexible and semi-rigid packages. Important characteristics of good sealing performance are:
a) low seal initiation temperature (SIT), which is needed to support high speed on packaging machines,
b) broad sealing window, which is especially needed for processing window on HFFS (Horizontal Form, Fill and Seal) packaging lines and
c) additionally high melting point, which is important, for example in biaxially oriented PP (BOPP), to avoid stickiness and blocking and accomplish high BOPP line speeds.

To ensure fast sealing, a low SIT is of advantage since by operating at lower temperature there is the benefit that the article to be sealed is not exposed to high temperatures. There are also economic advantages since lower temperatures are of course cheaper to generate and maintain.

There are further advantages by avoiding high sealing temperatures, especially when temperature sensitive goods are to be packed.

In the polyolefin film field, the properties of a specific type of film come generally from the polyolefin composition comprised in such film. Thus there is a general need of a polyolefin composition having low seal initiation temperature (SIT) and high melting point.

WO2011064119 discloses polyolefin compositions useful in the preparation of heat-sealable films, containing propylene copolymers and other polyolefin components, in particular polyolefin compositions comprising, all percentages being by weight:
a) from 60 to 94% of one or more copolymers of propylene with one or more comonomers selected from ethylene, a $C_4$-$C_8$ alpha-olefin and combinations thereof, where the comonomer, or comonomers, content in (a) is from 5 to 25%, preferably from 7 to 20%;
b) from 2 to 20% of one or more homo or copolymers of butene-1;
c) from 1 to 20% of an elastomeric or plastomeric polyolefin or polyolefin composition.

The polymerised comonomers are statistically distributed in the resulting copolymer. A balance of heat-sealability (very low Seal initiation temperature) and optical properties (in particular a low Haze) is obtained by blending a major amount of specific propylene copolymers with a butene-1 polymer and an elastomeric or plastomeric polyolefin or polyolefin composition.

The composition of WO2011064119 has different components than the inventive composition. Additionally the composition in WO2011064119 shows that low initiation temperature is achieved with at least 3 components in the composition. The object of the present invention is to solve one or more of the mentioned problems, in particular to provide a simpler composition presenting low sealing temperature and high melting point.

Irrespectively from the polymer type, a polymer must fulfil at best all desired end properties and additionally must be easily processable, i.e. must withstand stress. However, end properties and processing properties act often in a conflicting manner. It frequently turns out that improvement of one of the desired properties is achieved on the expense of the other properties.

Therefore there is still a need to design materials having an improved balance between high melting point and low sealing initiation temperature (SIT) thus having a broad sealing window and thermal stability.

The present invention is based on the finding that the above discussed needs for heat sealing applications, i.e. simultaneously having improved balance between high melting point and low sealing initiation temperature (SIT), broad sealing window and thermal stability can be achieved by a specific design of a polyolefin composition.

Thus the present invention provides a polypropylene composition being a binary blend comprising two propylene polymer fractions PPF1 and PPF2 in specific amounts:
a) 30 to 50 wt % of propylene polymer fraction PPF1 being a propylene copolymer comprising propylene monomers and 1.50 to 7.00 mol % of one comonomer selected from $C_4$-$C_{10}$ alpha-olefin and
b) 70 to 50 wt % of propylene polymer fraction PPF2 being a propylene terpolymer comprising propylene monomers, 0.30 to 3.00 mol % of ethylene comonomer and 3.50 to 12.00 mol % of one comonomer selected from $C_4$-$C_{10}$ alpha-olefin, characterized in that the polypropylene composition:
  i. has a melting temperature (Tm) in the range of 135 to 160° C. as determined by DSC according to ISO 11357.
  ii. satisfies the equation:

$$Delta = Tm - SIT$$

wherein Delta is in the range of 30 to 43° C., and wherein Tm is the melting temperature, in ° C., of the polypropylene composition according to the invention, SIT is the sealing initiation temperature, in ° C., of the polypropylene composition, as calculated from pellets via DSC measurement, according to the method described in the measuring methods section of this document, the amount of PPF1 and PPF2 being relative to the total sum of the propylene polymer fractions PPF1 and PPF2.

The polypropylene composition according to the invention is a binary blend comprising, preferably consisting of, propylene polymer fraction PPF1 and propylene polymer fraction PPF2. Especially good results are achieved in case the individual propylene polymer fractions PPF1 and PPF2 are present in specific amounts.

The propylene polymer fraction PPF1 is present in the polypropylene composition according to the invention in an amount of 30 to 50 wt %, preferably in an amount in the range of 35 to 50 wt %. The amount of PPF1 being relative to the sum of the propylene polymer fractions PPF1 and PPF2.

The propylene polymer fraction PPF2 is present in the polypropylene composition according to the invention in an amount of 70 to 50 wt %, preferably in an amount in the range of 65 to 50 wt %. The amount of PPF2 being relative to the sum of the propylene polymer fractions PPF1 and PPF2.

The propylene polymer fraction PPF1 is generally a propylene copolymer comprising one comonomer selected from $C_4$-$C_{10}$ alpha-olefin comonomer preferably one comonomer selected from $C_4$-$C_8$ alpha olefin comonomer, more preferably one comonomer selected from $C_4$-$C_6$ alpha olefin comonomer, even more preferably 1-butene ($C_4$).

The propylene copolymer (PPF1) generally has $C_4$-$C_{10}$ alpha-olefin comonomer units in an amount of 1.50 to 7.00 mol %, preferably in an amount of 2.30 to 6.10 mol %, more preferably in an amount of 3.00 to 5.40 mol %. The amount of $C_4$-$C_{10}$ alpha-olefin comonomer units is relative to the total amount of monomers in the propylene copolymer (PPF1).

Generally the melt flow rate ($MFR_2$) for the propylene copolymer (PPF1) is of ≤10.0 g/10 min. The $MFR_2$ for propylene copolymer (PPF1) is determined according to ISO 1133, at a temperature of 230° C. and under a load of 2.16 kg. It is preferred that the $MFR_2$ for the propylene copolymer (PPF1) is between 3.0 and 10.0 g/10 min, more preferably the $MFR_2$ is between 4.0 and 9.0 g/10 min. A suitable lower limit is 3.0 g/10 min, preferably 4.0 g/10 min. A suitable upper limit is 10.0 g/10 min, preferably 9.0 g/10 min. The lower and upper indicated values of the ranges are included.

The propylene polymer fraction PPF2 is generally a propylene terpolymer comprising ethylene comonomer and one comonomer selected from $C_4$-$C_{10}$ alpha-olefin, preferably ethylene comonomer and one comonomer selected from $C_4$-$C_8$ alpha olefin comonomer, more preferably ethylene comonomer and one comonomer selected from $C_4$-$C_6$ alpha olefin comonomer, even more preferably ethylene comonomer and 1-butene ($C_4$).

The propylene terpolymer (PPF2) generally has ethylene comonomer units in an amount of 0.30 to 3.00 mol %, preferably in an amount of 0.45 to 3.00 mol %, more preferably in an amount of 0.60 to 3.00 mol %. The amount of ethylene comonomer units is relative to the total amount of monomers in the propylene terpolymer (PPF2).

The propylene terpolymer (PPF2) generally has $C_4$-$C_{10}$ alpha-olefin comonomer units in an amount of 3.50 to 12.00 mol %, preferably in an amount of 5.00 to 9.50 mol %, more preferably in an amount of 6.00 to 9.50 mol %. The amount of $C_4$-$C_{10}$ alpha-olefin comonomer units is relative to the total amount of monomers in the propylene terpolymer (PPF2).

Generally the melt flow rate ($MFR_2$) for the propylene terpolymer (PPF2) is of 10.0 g/10 min. The $MFR_2$ for propylene terpolymer (PPF2) is calculated according to the method described in the measuring methods section of this document. It is preferred that the $MFR_2$ for the propylene terpolymer (PPF2) is between 3.0 and 10.0 g/10 min, more preferably the $MFR_2$ is between 4.0 and 9.0 g/10 min. A suitable lower limit is 3.0 g/10 min, preferably 4.0 g/10 min. A suitable upper limit is 10.0 g/10 min, preferably 9.0 g/10 min. The lower and upper indicated values of the ranges are included.

The polypropylene composition generally has a total amount of ethylene comonomer units in the range of 0.20 to 1.50 mol %, preferably in the range of 0.30 to 1.50 mol %, more preferably in the range of 0.45 to 1.50 mol %. The amount of ethylene comonomer units is relative to the total amount of monomers in the polypropylene composition.

The polypropylene composition generally has a total amount of $C_4$-$C_{10}$ alpha-olefin comonomer units in the range of 3.80 to 8.50 mol %, preferably in the range of 4.60 to 7.70 mol %, more preferably in the range of 5.30 to 7.30 mol %. The amount of $C_4$-$C_{10}$ alpha-olefin comonomer units is relative to the total amount of monomers in the polypropylene composition.

Generally the melt flow rate ($MFR_2$) for the polypropylene composition according to the invention is in the range of 3.0 to 10.0 g/10 min. The $MFR_2$ for the polypropylene composition is determined according to ISO 1133, at a temperature of 230° C. and under a load of 2.16 kg. It is preferred that the $MFR_2$ for the polypropylene composition is between 4.0 and 9.0 g/10 min, more preferably the $MFR_2$ is between 5.0 and 8.0 g/10 min. A suitable lower limit is 3.0 g/10 min, preferably 4.0 g/10 min, more preferably 5.0 g/10 min. A suitable upper limit is 10.0 g/10 min, preferably 9.0 g/10 min, more preferably 8.0 g/10 min. The lower and upper indicated values of the ranges are included.

Generally the polypropylene composition according to the invention has a sealing initiation temperature (SIT) in the range of 90 to 120° C., preferably in the range of 95 to 115° C., more preferably in the range of 100 to 110° C. The sealing initiation temperature (SIT) calculated on pellets via DSC measurement, according to the method described in the measuring methods section of this document.

Generally the polypropylene composition according to the invention has a melting temperature (Tm) in the range of 135 to 160° C., preferably in the range of 137 to 155° C., more preferably in the range of 140 to 150° C. The melting temperature (Tm) is determined by DSC according to ISO 11357.

Generally the polypropylene composition according to the invention has a xylene soluble fraction (XS) in the range of 3 to 15 wt %, preferably in the range of 4 to 15 wt %, more preferably in the range of 5 to 15 wt %. The xylene soluble fraction is determined at 25° C. according to ISO 16152; 5$^{th}$ edition; 2005 Jul. 1.

Generally the polypropylene composition according to the present invention satisfies the equation (1) below:

$$\text{Delta} = \text{Tm} - \text{SIT} \qquad \text{equation (1)}.$$

wherein Delta is in the range of 30 to 43° C., and wherein

Tm is the melting temperature, in ° C., of the polypropylene composition according to the invention, SIT is the sealing initiation temperature (SIT) calculated on pellets via DSC measurement, according to the method described in the measuring methods section of this document.

Preferably the Delta value according to equation (1) is in the range of 32 to 42° C., more preferably in the range of 34 to 41° C.

The present invention also provides a polypropylene composition according to the present invention characterized in that the propylene polymer fraction PPF1 is a propylene copolymer comprising 1-butene ($C_4$) and the propylene polymer fraction PPF2 is a propylene terpolymer comprising ethylene comonomer and 1-butene ($C_4$).

The polypropylene composition according to the invention can be produced by (melt)-mixing the individual propylene polymer fractions PPF1 and PPF2, i.e., the propylene copolymer (PPF1) and the propylene terpolymer (PPF2) according to the invention. Thus, the propylene polymer fractions PPF1 and PPF2 comprised in the polypropylene composition according to the invention may be produced in separate polymerisation processes and then mixed e.g., in a mixing device, preferably in a melt mixing device like an extruder. During the mixing suitable additives can additionally be added.

The polypropylene composition according to the invention may be produced in a polymerisation process. Therefore the propylene polymer fractions PPF1 and PPF2 are produced in said polymerisation process.

Polymerisation processes which are suitable for producing the polypropylene composition of the present invention generally comprises at least two polymerisation stages and each stage can be carried out in solution, slurry, fluidized bed, bulk or gas phase. In one particular embodiment the polymerisation process contains at least one bulk reactor stage (e.g., a slurry or a loop reactor stage) and at least one gas phase reactor stage, each stage comprising at least one reactor and all reactors being arranged in cascade. In one particularly preferred embodiment the polymerisation process comprises at least one bulk reactor and at least one gas phase reactor arranged in that order.

In some further preferred embodiments the polymerisation processes comprises one bulk reactor (e.g., a slurry reactor or a loop reactor) and at least one gas phase reactor, e.g. one or two gas phase reactors. The polymerisation process may further comprise pre- and post-reactor stages. Pre-reactor stages comprise typically pre-polymerisation reactors. In this kind of polymerisation processes high polymerisation temperatures are generally used in order to achieve specific properties of the resulting propylene copolymers. Typical temperatures in the processes are 60° C. or higher, preferably 80° C. or higher, more preferably 85° C. or higher. The high polymerisation temperatures as mentioned above can be applied either in some or all reactors of the reactor cascade.

A preferred polymerisation process is a "loop-gas phase"-process, such as developed by Borealis and known as BORSTAR™ technology. Examples of this polymerisation process are described in EP0887379, WO92/12182, WO2004/000899, WO2004/111095, WO99/24478, WO99/24479 and WO00/68315.

The invention hence also relates to a most preferred process for producing the polypropylene composition according to the invention by a sequential polymerisation process comprising at least two reactors connected in series, said process comprising the steps:

a) polymerising in a first reactor being a slurry reactor, preferably a loop reactor (R-1), propylene and one comonomer selected from $C_4$-$C_{10}$ alpha-olefin obtaining a propylene polymer fraction (PPF1), being a propylene copolymer according to the invention, b) transferring the propylene polymer fraction (PPF1) and unreacted comonomers of the reactor (R-1) into a second reactor (R-2) being a first gas-phase reactor-1 (GPR-1), c) in the gas-phase reactor-1 (GPR-1) propylene, ethylene and one comonomer selected from $C_4$-$C_{10}$ alpha-olefin are polymerised in the presence of the propylene polymer fraction (PPF1), obtaining a propylene polymer fraction (PPF2), being a propylene terpolymer according to the invention, said propylene polymer fraction (PPF2) and the propylene polymer fraction (PPF1) forming the polypropylene composition according to the invention, d) recovering the polypropylene composition according to the invention.

After the polymerisation in the gas-phase reactor-1 (GPR-1) is finished, the polypropylene composition according to the invention is recovered by conventional procedures. The recovered polypropylene composition according to the invention is generally in the form of particles. The resulting polypropylene composition in form of particles may be pelletized in a conventional compounding extruder with various additives such as stabilizers, antioxidants, ultraviolet absorbers, antistatic agents and slipping agents. Typically the polypropylene composition according to the invention may contain not more than 5.0 wt %, yet more preferably not more than 3.0 wt %, like not more than 2.0 wt % of additives mentioned herein.

Generally a polymerisation catalyst is present in the polymerisation process for producing according to the invention. The polymerisation catalyst can be a metallocene catalyst or a Ziegler-Natta catalyst. Generally the Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

Preferably a specific type of Ziegler-Natta catalyst is present in the polymerisation process according to the invention. In this specific type of Ziegler-Natta catalyst it is essential that the internal donor is a non-phthalic compound. Preferably through the whole specific type of Ziegler-Natta catalyst preparation no phthalate compounds are used thus the final specific type of Ziegler-Natta catalyst does not contain any phthalic compound. Therefore the propylene polymer fractions PPF1 and PPF2 are free of phthalic compounds.

Generally the specific type of Ziegler-Natta catalyst comprises an internal donor (ID) which is chosen to be a non-phthalic compound, in this way the specific type of Ziegler-Natta catalyst is fully free of undesired phthalic compounds. Further the specific type of Ziegler-Natta catalyst can be a solid catalyst being preferable free of any external support material, like silica or $MgCl_2$, and thus the solid catalyst is self-supported.

The solid catalyst is obtainable by the following general procedure:

a) providing a solution of $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or $a_4$) Group 2 metal alkoxy compound of formula $M(OR_1)_n(OR_2)_m X_{2-n-m}$ or mixture of Group 2 alkoxides $M(OR_1)_n X_{2-n}$, and $M(OR_2)_m X_{2-m}$, where M is a Group 2 metal, X is halogen, $R_1$ and $R_2$ are different alkyl groups of 2 to 16 carbon atoms, and $0 \leq n < 2$, $0 \leq m < 2$ and $n+m+(2-n-m)=2$, provided that n and m are not 0 simultaneously, $0 < n' \leq 2$ and $0 < m' \leq 2$; and b) adding said solution from step a) to at least one compound of a transition metal of Group 4 to 6 and
c) obtaining the solid catalyst component particles, and adding a non-phthalic internal electron donor (ID) at least in one step prior to step c).

The internal donor (ID) or precursor thereof is added preferably to the solution of step a) or to the transition metal compound before adding the solution of step a).

According to the procedure above the solid catalyst can be obtained via a precipitation method or via an emulsion-solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of $a_2$ or $a_3$ is used, i.e. a solution of (Ax') or a solution of a mixture of (Ax) and (Bx).

Preferably the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as ready magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that the magnesium compound reacts in addition to the alcohol (A) and alcohol (B) with a polyhydric alcohol (C) of formula $R''(OH)_m$ to obtain said magnesium alkoxide compound. Preferred polyhydric alcohols, if used, are alcohols, wherein R" is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like $TiCl_4$.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives of any of them and/or mixtures of any of them. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion-solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 μm, preferably 10 to 100 μm. The particles generally are compact with low porosity and generally have a surface area below 20 g/m², more preferably below 10 g/m². Typically the amount of Ti present in the catalyst is in the range of 1 to 6 wt %, the amount of Mg is in the range of 10 to 20 wt % and the amount of internal donor present in the catalyst is in the range of 10 to 40 wt % of the catalyst composition. A detailed description of the preparation of the catalysts used in the present invention is disclosed in WO2012/007430, EP2610271 and EP2610272 which are incorporated here by reference.

An external donor (ED) is preferably present as a further component in the polymerisation process. Suitable external donors (ED) include certain silanes, ethers, esters, amines, ketones, heterocyclic compounds and blends of these. It is especially preferred to use a silane. It is most preferred to use silanes of the general formula (I)

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (I) are $(tert\text{-}butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$. Another most preferred silane is according to the general formula (II)

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst can be used. The co-catalyst is preferably a compound of group 13 of the periodic table (IUPAC, version 2013), such as for example an aluminum compound e.g. an organo aluminum or aluminum halide compound. An example of a suitable organo aluminium compound is an aluminum alkyl or aluminum alkyl halide compound. Accordingly in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally the ratio between the co-catalyst (Co) and the external donor (ED) [Co/ED] and/or the ratio between the co-catalyst (Co) and the transition metal (TM) [Co/TM] is carefully chosen for each process. The ratio between the co-catalyst (Co) and the external donor (ED), [Co/ED] can suitably be in the range of 3.0 to 45.0 mol/mol, preferably in the range of 4.0 to 35.0 mol/mol, more preferably in the range of 5.0 to 30.0 mol/mol. A suitable lower limit can be 3.0 mol/mol, preferably 4.0 mol/mol, more preferably 5.0 mol/mol. A suitable upper limit can be 45.0 mol/mol, preferably 35.0 mol/mol, more preferably 30.0 mol/mol. The lower and upper indicated values of the ranges are included.

The ratio between the co-catalyst (Co) and the transition metal (TM), [Co/TM] can suitably be in the range of 40.0 to 500 mol/mol, preferably in the range of 50.0 to 400 mol/mol, more preferably in the range of 60.0 to 350 mol/mol. A suitable lower limit can be 40.0 mol/mol, preferably 50.0 mol/mol, more preferably 60.0 mol/mol. A suitable upper limit can be 500 mol/mol, preferably 400 mol/mol, more preferably 350 mol/mol. The lower and upper indicated values of the ranges are included.

The present invention also provides an article comprising the polypropylene composition according to the invention. Suitable articles comprising the polypropylene composition according to the invention are films, e.g., films for flexible packaging systems, such as bags or pouches for food packaging in general.

Preferred articles are mono-layer or multilayer films which can be obtained by any process known to an art skilled person, like cast film technology or blown film technology. The films are preferably used in multilayer film structures as sealing layer, preferably as very thin sealing layer, on top of the multilayer structure.

Accordingly the present invention is also related to an article comprising at least 70.0 wt %, preferably comprising at least 80.0 wt %, more preferably comprising at least 90.0 wt %, still more preferably comprising at least 95.0 wt %, yet more preferably comprising at least 99.0 wt % of the polypropylene composition according to the invention.

Finally the present invention relates to the use of the polypropylene composition according to the invention for producing an article, a film or a multi-layer film.

EXAMPLES

I. Measuring Methods

The following definitions of terms and determination methods apply for the above general description of the invention as well as to the below examples, unless otherwise defined.

a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

b) Melt Flow Rate ($MFR_2$) for the Propylene Terpolymer (PPF2)

The $MFR_2$ for the propylene terpolymer (PPF2) is calculated using the below formula:

$$\ln(MFR_2 \text{ of the polypropylene composition}) = x(\ln(MFR_2 \text{ of the propylene copolymer (PPF1)})) + (1-x)(\ln(MFR_2 \text{ of the propylene terpolymer (PPF2)}));$$

wherein $MFR_2$ of the polypropylene composition means the $MFR_2$ of the PP composition according to the present invention and wherein x=the weight ratio (wt) of the propylene copolymer (PPF1) based on the combined weight of the propylene copolymer (PPF1) and the weight of the propylene terpolymer (PPF2) which is in total=1.

c) Melting Temperature

The melting temperature, Tm, is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The melting temperature (Tm) is being determined in the second heating step.

d) Xylene Cold Soluble Fraction (XS, wt %)

The amount of the polymer soluble in xylene is determined at 25.0° C. according to ISO 16152; 5$^{th}$ edition; 2005 Jul. 1.

e) Comonomer Content

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm.

Characteristic signals corresponding to the incorporation of 1-butene were observed and the comonomer content quantified in the following way. The amount isolated 1-butene incorporated in PBP sequences was quantified using the integral of the $\alpha B2$ sites at 43.6 ppm accounting for the number of reporting sites per comonomer:

$$B = I_{\alpha B2}/2$$

The amount consecutively incorporated 1-butene in PBBP sequences was quantified using the integral of the $\alpha\alpha B2$ site at 40.5 ppm accounting for the number of reporting sites per comonomer:

$$BB = 2*I_{\alpha\alpha B2}$$

The total 1-butene content was calculated based on the sum of isolated and consecutively incorporated 1-butene:

$$B\text{total} = B + BB$$

Characteristic signals corresponding to the incorporation of ethylene were observed and the comonomer content quantified in the following way. The amount isolated ethylene incorporated in PEP sequences was quantified using the integral of the $S\alpha\gamma$ sites at 37.9 ppm accounting for the number of reporting sites per comonomer:

$$E = I_{S\alpha\gamma}/2$$

When characteristic signals corresponding to consecutive ethylene incorporation in PEEP sequences were observed the amount of such consecutively incorporated ethylene was quantified using the integral of $S_{\beta\delta}$ sites at 27 ppm accounting for the number of reporting sites per comonomer:

$$EE = I_{S\beta\delta}$$

With no sites indicative of consecutive ethylene incorporation in PEEE sequences observed the total ethylene comonomer content was calculated as:

$$E\text{total} = E + EE$$

Characteristic signals corresponding to regio defects were not observed {resconi00}.

The amount of propene was quantified based on the main $S\alpha\alpha$ methylene sites at 46.7 ppm and compensating for the relative amount of methylene unit of propene in PBP, PBBP, PEP and PEEP sequences not accounted for:

$$P\text{total} = I_{S\alpha\alpha} + B + BB/2 + E + EE/2$$

The total mole fraction of 1-butene in the polymer was then calculated as:

$$fB = (B\text{total}/(E\text{total} + P\text{total} + B\text{total})$$

The total mole fraction of ethylene in the polymer was then calculated as:

$$fE = (E\text{total}/(E\text{total} + P\text{total} + B\text{total})$$

The mole percent comonomer incorporation was calculated from the mole fractions:

$$B[\text{mol \%}] = 100*fB$$

$$E[\text{mol \%}] = 100*fE$$

The weight percent comonomer incorporation was calculated from the mole fractions:

$$B[\text{wt \%}] = 100*(fB*56.11)/((fE*28.05) + (fB*56.11) + ((1-(fE+fB))*42.08))$$

$$E[\text{wt \%}] = 100*(fE*28.05)/((fE*28.05) + (fB*56.11) + ((1-(fE+fB))*42.08)).$$

klimke06
Klimke, K., Parkinson, M., Piel, C., Kaminsky, W., Spiess, H. W., Wilhelm, M., Macromol. Chem. Phys. 2006; 207: 382.
parkinson07
Parkinson, M., Klimke, K., Spiess, H. W., Wilhelm, M., Macromol. Chem. Phys. 2007; 208:2128.
pollard04

Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
resconi00
Resconi, L., Cavallo, L., Fait, A., Piemontesi, F., Chem. Rev. 2000, 100, 1253

The comonomer content of the propylene terpolymer (PPF2) is calculated using the below formula:

Comonomer content of the polypropylene composition=$x$(Comonomer content of the propylene copolymer (PPF1))+(1−$x$)(Comonomer content of the propylene terpolymer (PPF2)).

$x$=the weight ratio (wt) of the propylene copolymer (PPF1) based on the combined weight of the propylene copolymer (PPF1) and the weight of the propylene terpolymer (PPF2) which is in total =1.

f) Sealing Initiation Temperature (SIT), Sealing Range

Differential Scanning calorimetry (DSC) experiments were run on a TA Instruments Q2000 device calibrated with Indium, Zinc, and Tin according to ISO 11357/1. The measurements were run under nitrogen atmosphere (50 mL min−1) on 5±0.5 mg samples in a heat/cool/heat cycle with a scan rate of 10° C./min between −30° C. and 225° C. according to ISO 11357/3. Melting (Tm) and crystallisation (Tc) temperatures were taken as the peaks of the endotherms and exotherms in the cooling cycle and the second heating cycle respectively.

The Sealing Initiation Temperature (SIT) was predicted by analyzing the second heating scan according to the following procedure: the first limit for integration was set at 16° C., the second limit at Tm+20° C., and the total melting enthalpy was registered. The temperature T1 is defined as the temperature at which 19% of this melting enthalpy with the abovementioned limits for integration was obtained. The parameter SIT is finally calculated as:

SIT=1.0596×$T1$+3.8501

II. Inventive and Comparative Examples a) Catalyst Preparation 3.4 litre of 2-ethylhexanol and 810 ml of propylene glycol butyl monoether (in a molar ratio 4/1) were added to a 20.0 l reactor. Then 7.8 litre of a 20.0% solution in toluene of BEM (butyl ethyl magnesium) provided by Crompton GmbH, were slowly added to the well stirred alcohol mixture. During the addition the temperature was kept at 10.0° C. After addition the temperature of the reaction mixture was raised to 60.0° C. and mixing was continued at this temperature for 30 minutes. Finally after cooling to room temperature the obtained Mg-alkoxide was transferred to a storage vessel.

21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor

Wash 2: washing was made with a mixture of 30 ml of TiCl4 and 1 ml of donor.

Wash 3: washing was made with 100 ml of toluene.

Wash 4: washing was made with 60 ml of heptane.

Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

b) Inventive Examples (IE1 and IE2)

The inventive examples (IE) were produced in a pilot plant with a prepolymerisation reactor, one slurry loop reactor and one gas phase reactor. The solid catalyst component described above was used for the inventive examples IE1 and IE2 along with triethylaluminium (TEAL) as co-catalyst and dicyclo pentyl dimethoxy silane (D-donor) as external donor.

c) Comparative Examples (CE1, CE2 and CE3)

CE-1 is a $C_2C_4$ propylene terpolymer having a narrow molecular weight distribution, $MFR_2$ of 6.0 g/10 min and melting point of 130° C., seal initiation temperature (SIT) of 103° C. and is manufactured and distributed by Borealis under the Trade name TD315BF.

CE-2 is a $C_2C_4$ propylene terpolymer having a medium molecular weight distribution, $MFR_2$ of 6.0 g/10 min and melting point of 130° C., seal initiation temperature (SIT) of 103° C. and is manufactured and distributed by Borealis under the Trade name TD210BF.

CE-3 is a $C_2C_4$ propylene terpolymer having a medium molecular weight distribution, $MFR_2$ of 6 g/10 min and melting point of 130° C., seal initiation temperature (SIT) of 103° C. and is manufactured and distributed by Borealis under the Trade name TD215BF.

TABLE 1

Polymerisation conditions.

| | | IE-1 | IE2 |
|---|---|---|---|
| Loop (propylene polymer fraction PPF1) | | | |
| Temperature | [° C.] | 70 | 70 |
| Pressure | [kPa] | 5340 | 5225 |
| Residence time | [h] | 0.47 | 0.50 |
| Split | [%] | 46 | 39 |
| $H_2/C_3$ ratio | [mol/kmol] | 0.91 | 0.60 |
| $C_4/C_3$ ratio | [mol/kmol] | 123 | 88 |
| $MFR_2$ | [g/10 min] | 5.6 | 4.9 |
| $C_4$ content | [mol %] | 4.0 | 3.8 |
| GPR 1 (propylene polymer fraction PPF2) | | | |
| Temperature | [° C.] | 80 | 75 |
| Pressure | [kPa] | 2500 | 2400 |
| Residence time | [h] | 1.82 | 2.3 |
| Split | [%] | 54 | 61 |
| $H_2/C_3$ ratio | [mol/kmol] | 10.1 | 14.9 |
| $C_2/C_3$ ratio | [mol/kmol] | 15.2 | 12 |
| $C_4/C_3$ ratio | [mol/kmol] | 203 | 143.9 |
| $MFR_2$ GPR 1 | [g/10 min] | 5.4 | 5.8 |
| $C_2$ content | [mol %] | 2.7 | 2.0 |
| $C_4$ content | [mol %] | 8.3 | 8.2 |
| Polypropylene composition | | | |
| $MFR_2$ | [g/10 min] | 5.6 | 5.4 |
| XS | [wt %] | 10.1 | 14.8 |
| $C_4$ content total | [mol %] | 6.3 | 6.4 |
| $C_2$ content total | [mol %] | 1.5 | 1.2 |
| Melting point | [° C.] | 144.0 | 140.7 |

TABLE 2

Melting temperature (Tm), Seal initiation temperature (SIT) and Delta values of inventive examples (IE1, IE2) and comparative examples (CE1, CE2, CE3).

| | IE1 | IE2 | CE1 | CE2 | CE3 |
|---|---|---|---|---|---|
| Tm | 143.5 | 140.7 | 129.8 | 132.8 | 131.3 |
| SIT [° C.] | 102.5 | 102.0 | 101.0 | 106.0 | 106.0 |
| Delta (Tm-SIT) | 41.0 | 38.7 | 29.0 | 27.0 | 25.0 |

From Table 2 it can be derived that the polypropylene compositions according to the invention present higher melting temperature (Tm) values and higher Delta (Tm–SIT) values than the comparative examples.

The invention claimed is:

1. Polypropylene composition that is a binary blend comprising two propylene polymer fractions PPF1 and PPF2 in specific amounts:
   a) 30 to 50 wt % of propylene polymer fraction PPF1 that is a propylene copolymer comprising propylene monomer and 1.50 to 7.00 mol % of one comonomer selected from $C_4$-$C_{10}$ alpha-olefin, and
   b) 70 to 50 wt % of propylene polymer fraction PPF2 that is a propylene terpolymer comprising propylene monomer, 0.30 to 3.00 mol % of ethylene comonomer and 3.50 to 12.00 mol % of one comonomer selected from $C_4$-$C_{10}$ alpha-olefin, wherein the polypropylene composition:
   i. has a melting temperature (Tm) in a range of 135 to 160° C. as determined by DSC according to ISO 11357,
   ii. satisfies the equation:

Delta=Tm−SIT wherein Delta is in a range of 30 to 43° C., and wherein Tm is melting temperature, in ° C., of the polypropylene composition,
   SIT is sealing initiation temperature, in ° C., of the polypropylene composition, as calculated from pellets via DSC analysis,
   wherein amounts of PPF1 and PPF2 being are relative to a total sum of the propylene polymer fractions PPF1 and PPF2, and
   wherein the polypropylene composition has an amount of xylene soluble (XS) in a range of 3 to 15 wt %, as determined at 25° C. according ISO 16152; 5$^{th}$ edition; 2005-07-01.

2. Polypropylene composition according to claim 1, wherein the polypropylene composition has an $MFR_2$ in a range of 3.0 to 10.0 g/10 min, as measured at 230° C. under a load of 2.16 kg according to ISO 1133.

3. Polypropylene composition according to claim 1, wherein the propylene polymer fraction PPF1 is a propylene copolymer comprising 1-butene ($C_4$) and the propylene polymer fraction PPF2 is a propylene terpolymer comprising ethylene comonomer and 1-butene ($C_4$).

4. Process for producing the polypropylene composition according to claim 1, by a sequential polymerisation process comprising at least two reactors connected in series, said process comprising the steps:
   a) polymerising in a first reactor that is a slurry reactor propylene and one comonomer selected from $C_4$-$C_{10}$ alpha-olefin and obtaining a propylene polymer fraction PPF1,
   b) transferring the propylene polymer fraction PPF1 and unreacted comonomers of a reactor (R-1) into a second reactor (R-2) that is a gas-phase reactor-1 (GPR-1),
   c) polymerising in the gas-phase reactor-1 (GPR-1) propylene, ethylene and one comonomer selected from $C_4$-$C_{10}$ alpha-olefin in the presence of the propylene polymer fraction PPF1, and obtaining a propylene polymer fraction PPF2, that is a propylene terpolymer, said propylene polymer fraction PPF2 and the propylene polymer fraction PPF1 forming the polypropylene composition,
   d) recovering the polypropylene composition.

5. A film comprising the polypropylene composition according to claim 1.

6. The film according to claim 5 wherein said film is a blown film or a cast film.

7. The film according to claim 5, wherein said film is a multilayer film.

\* \* \* \* \*